L.W. GACKI  INVENTOR.

L.W. GACKI  INVENTOR.

L.W. GACKI INVENTOR.

United States Patent Office 2,938,448
Patented May 31, 1960

2,938,448

X-RAY FILM PROCESSING TANK AND INTERCHANGEABLE CASCADE UNIT

Leonard W. Gacki, Jamaica, N.Y., assignor to X-Ray Instrument Company, a corporation of New York Filed Mar. 2, 1955, Ser. No. 491,694

2 Claims. (Cl. 95—89)

This invention relates to X-ray film processing and developing apparatus. Particularly the invention refers to a tank of this description in which a novel form of cascade unit is interchangeably suspended within a processing compartment of the tank.

The cascade principle is uniquely suited to X-ray film processing. It is particularly desirable in processing tanks wherein the temperature of processing solutions, separately maintained in auxiliary containers, is conductively dependent upon control of the temperature of washing fluid in which the auxiliary containers and negative film conventionally are suspended. That the principle has not found wider utilization in the art is attributable to failure on the part of tank designers to achieve most effective integration of cascade, fluid circulation and drainage facilities. Thus, in tanks where the gravitational fall of cascaded fluid is excessively high, splash may endanger dilution or contamination of processing solutions. If cascading occurs prior to contact between the washing fluid and the suspended auxiliary containers, the resulting drop in fluid temperature may complicate control of the temperature of the processing solutions. Also, where the cascaded overflow is drawn from too limited an area of the surface of the washing fluid, or where the cascade is improperly located with respect to the circulatory path of the washing fluid, chemical impurities tend to form a sludgy accumulation in immobile areas of the fluid surface. Unless disposal of these fluid borne impurities is immediate, drains may clog and contaminated splash may streak, stain or otherwise spoil valuable negatives in process. Shortcomings such as these usually are not prevalent in larger, more expensive tank installations where drainage facilities are enclosed, or where auxiliary tank closures and elaborate, self contained, temperature control or agitation systems and other safeguards customarily are built into the equipment. Increased bulk and complexity of larger structures, however, introduces other problems as in installation, movement or servicing of the equipment, particularly in establishments where space allocatable to darkrooms and processing apparatus is limited.

The aforementioned insufficiencies of prior art processing and developing tanks have been largely obviated by the interchangeable cascade unit of the present invention, where a substantial increase in the length of the cascade barrier makes available an effectively greater fluid surface area from which spent washing fluid and impurities may be drawn for relatively splash-free drainage and disposal. Due also to the facility with which inlet, outlet and other controls may be concentrated in an accessible part of the structure, the cascade tank of the invention may be operably located in areas of a photographic laboratory hitherto not available for equipment of equivalent capacity.

Accordingly, it is an object of the invention to provide a compact processing and developing tank having a cascade unit detachably mounted therein and so positioned with respect to the direction of flow of turbulently circulated washing fluid, as to provide for continuous disposal of spent fluid and impurities cascaded from separate areas of the washing fluid.

It is also an object of the invention to provide a film processing and developing tank having an interchangeable cascade unit which can be quickly and conveniently assembled or conditioned for cleaning and repair.

A further object of the invention is the provision of an X-ray film processing tank in which processing solutions in auxiliary containers are separately suspendable in a turbulently circulated washing fluid from which spent portions and impurities may be cascaded in any direction over a barrier surrounding a fluid disposal area.

Another object of the invention is the provision of a cascade tank for X-ray film processing which is adaptable to installation within an alcove and in which all controls and connections of the tank and of an interchangeable cascade unit are readily accessible from the front of the tank.

It is also an object of the invention to provide a cascade processing tank which is less expensive to build, maintain and operate.

For a better understanding of the invention together with other and further objects thereof, reference is had to the following drawings and description in connection with the appended claims defining its scope.

Figure 1:
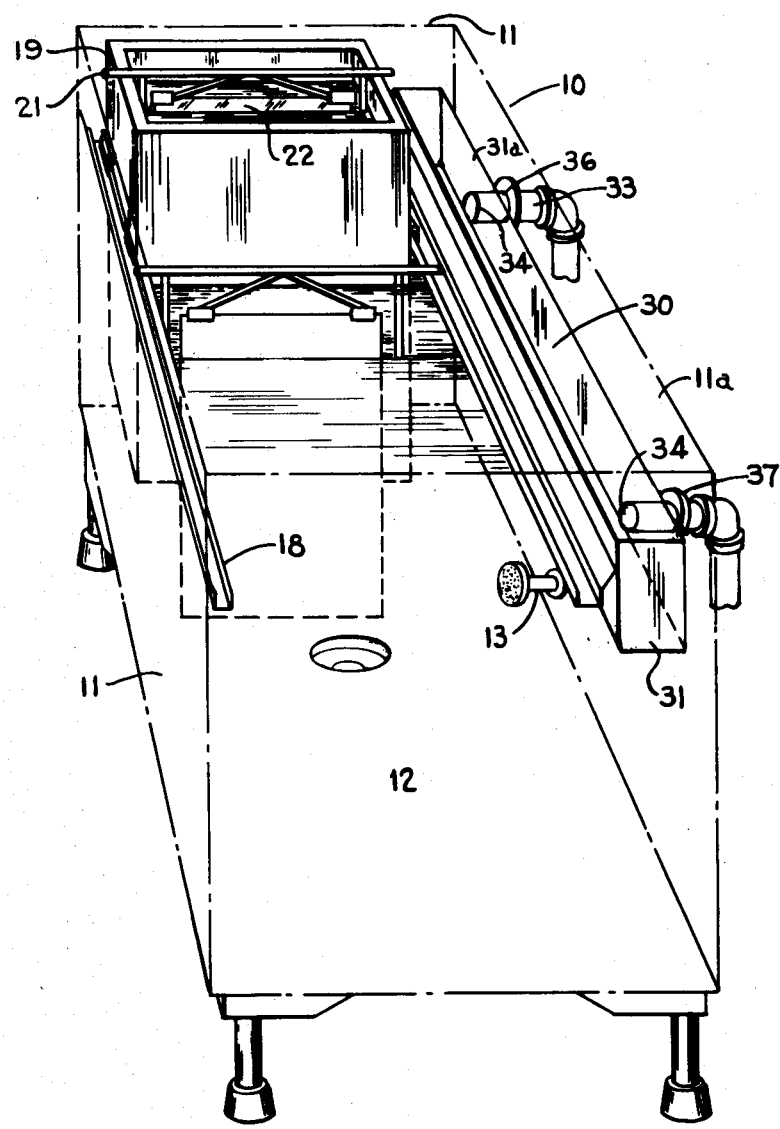
Fig. 1, is a perspective view of the processing and developing apparatus in accordance with the invention in which walls of the tank are indicated in shadow detail so as to reveal more clearly means of suspension for auxiliary tanks, film hangers and the interchangeable cascade unit.

As generally indicated at 10, in Fig. 1, an X-ray film processing and development tank comprises walls 11, bottom 12, of any suitable material, for example stainless steel sheeting encasing glass wool or other suitable heat insulator. A wall 11a, of the tank may be provided with inlet 13, in communication with suitable pipe leads from conventional temperature controls, generally indicated at 13a, in Fig. 2. The inlet may include a screened, directional spray or nozzle 14, to regulate and control the direction and turbulence of the washing fluid within processing compartment 17, in accordance with specific requirements for individual negatives in process. Film hangers 21, support flatly dependent film negatives 22, interchangeably immersible either in the washing fluid or in the developing, fixing and hardening solutions of separately supported auxiliary tanks 19. The film hangers project above the surface of the solutions which facilitates transfer of negatives from one process to another. The auxiliaries themselves are interchangeably suspendable from parallel strip hangers 18, rigidly fixed to the tank walls, and 18a, similarly secured to the cascade receptacle 30. The latter unit will be described in greater detail hereafter. Outlet 15, having valve 16, is provided for emptying the main tank processing compartment for cleaning or other purposes.

Tanks of the type so far described but lacking internal cascade discharge apparatus as described herein have been quite generally applied to film processing. It was recognized, however, that without means for immediate disposal of temperature spent washing fluid as well as of the accumulated impurities drained therein from the surface of chemically processed negatives, the advantage of temperature control exercised via the temperature of the circulated washing fluid could not be satisfactorily utilized in the critical processing of X-ray film. Two types of cascade tanks have evolved. Those in which waste material is disposed directly over the tank wall and those in which disposal occurs within the tank walls prior to drainage from the tank. Both types have been limited by increased bulkiness of the structure which disposal by cascade necessitates. A compromise solution is indicated in U.S. Letters Patent 2,747,482, Gacki et al., dated May 29, 1956, in which a cascade receptacle within the walls but outside the processing or washing compartment is described. Though less expensive to build than the more elaborate and complicated structures of the cascade unit of prior art, the tank of the aforementioned application is not interchangeable and cascading occurs in one direction only.

Accordingly, in the tank of the present invention, cascade receptacle 30 is a separate, integrally formed unit, detachably mountable within a processing compartment of a film processing and development tank. The cascade unit comprises walls 31, bottom 32, and has pipe leads 33 welded or otherwise permanently affixed to and protruding therefrom to provide as many outlets 34 as may be needed. Completely surrounding the open side of the receptacle is cascade barrier 35, constituting a continuously smooth rim accessible from all sides to the overflow of washing fluid from processing compartment 17. The free space between walls 31, 31a of the receptacle and walls 11a of the tank compartment, is clearly indicated.

Figure 2:
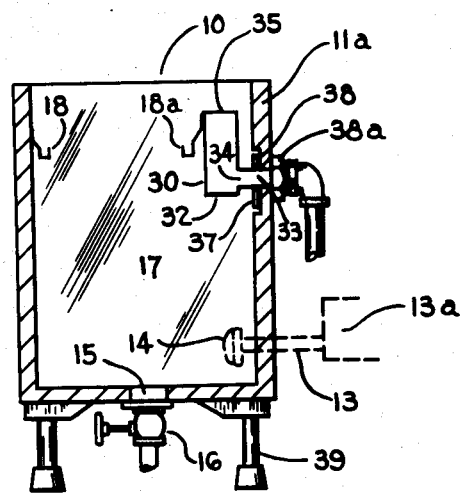
Fig. 2, is a cross sectional view of a tank constructed in accordance with the invention and illustrating means for suspending a cascade receptacle from a wall thereof, and showing means for circulating washing fluid at controlled temperature within the tank processing compartment.
Figure 3:
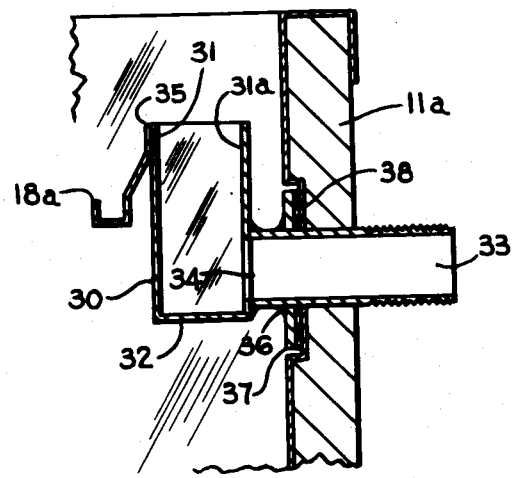
Fig. 3, is an enlarged cross sectional view of details of suspension of the cascade unit.

The manner in which the cascade receptacle is supported from the side walls of the tank is shown in greater detail in Figs. 2 and 3. Rear wall 11a of the tank has preformed apertures located at identical height with respect to the tank bottom through which leads 33 of the receptacle are insertable. The apertures thus serve as convenienit locators or guides for quick and positive placement of the cascade unit in correct level position. About the neck of each lead is welded or otherwise fixed, metallic member 37 supporting washer or gasket 38 of rubber or equally suitable material. When threaded member 38a is tightened upon protruding threaded portion of the lead, the gasket is forcefully compressed against the tank wall within a recess to render the connection completely water tight with as little as possible obstruction to fluid flow.

With the cascade unit positioned as described, it will be noted that all sides of the cascade barrier are spaced an appreciable distance from the walls of the tank. This is an important feature because the entire perimeter of the cascade receptacle thus is available for the unobstructed cascade thereover of spent fluid and impurities. The effective area of fluid surface, from which waste matter may be drawn, consequently, is approximately two times that of prior art devices having interior cascade, where the barrier is extended the length of one side only. It will be observed also that the level of the fluid escaping over the barrier 35 may be precisely equalized by adjustment of tank levelling feet 39.

Figure 4:
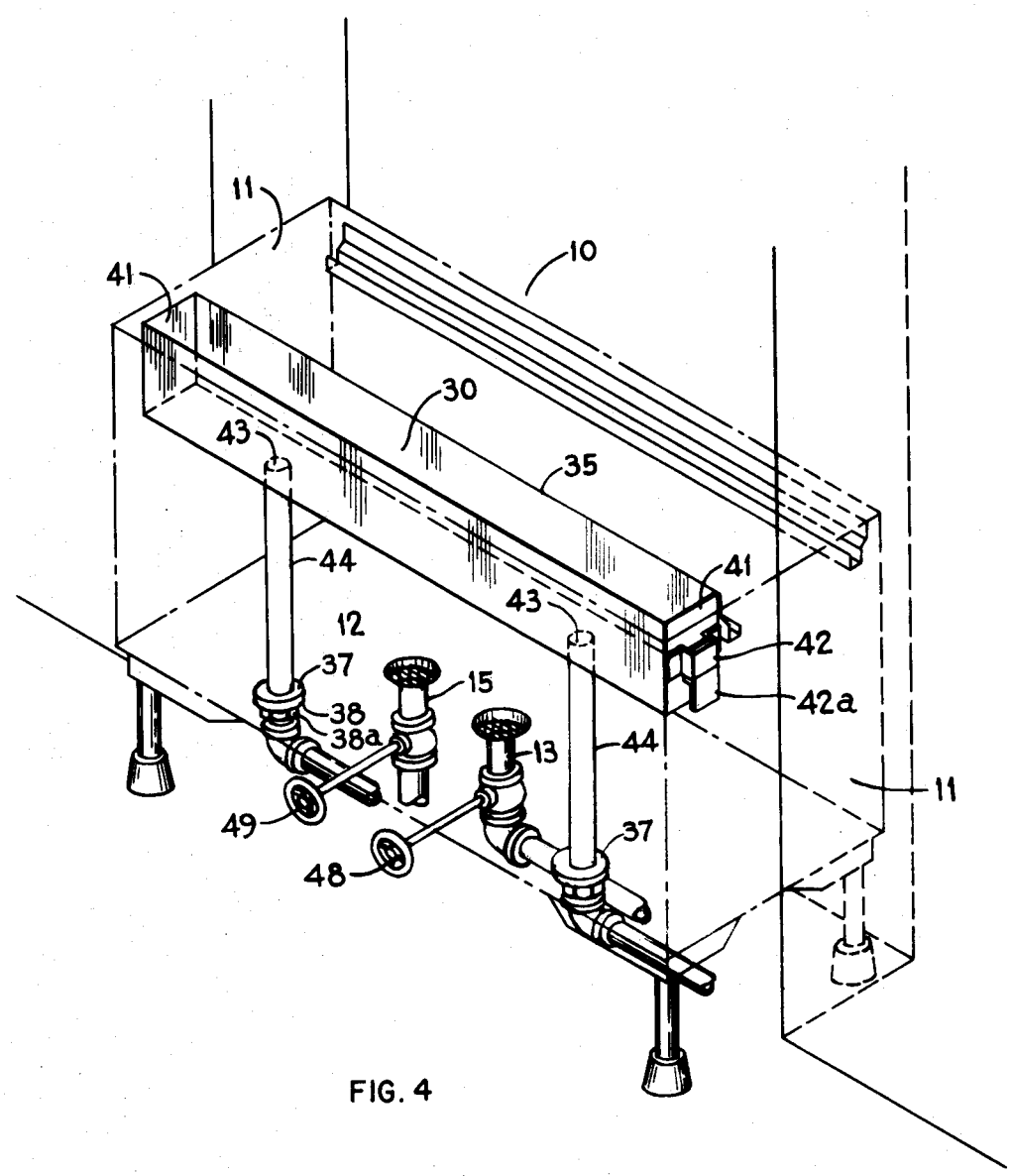
Fig. 4, is an isometric view of a processing and developing tank illustrating a preferred arrangement suitable for installation in an alcove, in which all controls and essential piping connections for the tank and for the cascade unit are completely accessible from the front of the tank.

Notable also in connection with Fig. 1, or in Fig. 4, the preferred embodiment, is the orientation of the cascade receptacle, auxiliary tank units and hanger supported negatives with respect to the circulatory path of the temperature controlled washing fluid from inlet 13. As has been mentioned previously, cascade disposal in a film processing tank is most effective where the tank interior is free of obstructions which tend to interrupt the direction and continuity of fluid circulation. Auxiliary tanks and film negatives suspended in the washing fluid are no less obstructional in this respect than faults in the tank structure. Unless these units are positioned so as to offer the least resistance to fluid circulation, the formation of pockets of stagnation cannot be prevented. Slushy impurities tend to accumulate in the stagnant areas and to jeopardize drainage. In the tank of the invention, auxiliaries and film hangers are placed endwise of the direction of fluid circulation to form parallel aisles of fluid flow from the inlet, circumscribing the tank interior. The cascade receptacle is positioned across the aisles of flow, normally of the paths established therefor. The advantage of multidirectional cascade in this connection is apparent. Backwash of fluid borne impurities is effectively prevented and the continuous disposal of waste from all areas of the surface of the fluid is assured.

The preferred embodiment illustrated in Fig. 4 differs from the modification previously described in that inlet 13, outlet 15, and apertures for insertion of leads of the cascade receptacle are all located in the tank bottom 12. Valves 48, 49 controlling tank inlet and outlet respectively, and all essential drain and pipe connections, in this embodiment, are conveniently accessible from the front of the tank.

Cascade receptacle 30 includes walls 41, integral pipe leads 44, and cascade barrier 35. The leads fixed to the receptacle as by welding, project through apertures in the tank bottom and are provided with metal flanges 37, gasket material 38, and outside threaded member 38a, as previously described, to provide essential water tight connection for drainage of the receptacle. End walls of the receptacle may have fixed thereto snap fasteners in the form of U brackets 42 resiliently mating with suitable guide receptors 42a fixed to end walls 11 of the tank. The particular form of the fastener applied is not germane to the invention, but it will be understood that the combined functions of aligning, fixing and bracing the cascade receptacle are important considerations inasmuch as the receptacle must be quickly locateable levelled and firmly positioned to maintain the accessory processing units and hanger dependent negatives shown in Fig. 1. Vertical support of the receptacle, supplemented by bracing against opposite walls of the tank, as described, provides a stronger structure and, due to location of the inlet in the bottom of the tank, maintains the positional advantages inherent in the particular placement of the separate units with respect to the path of circulation of the washing fluid previously described.

The walls of an alcove are indicated in shadow detail in Fig. 4. In such locations, installations or disconnection for servicing processing tanks may involve major operations. In the tank of the invention, however, all controls, valves and essential plumbing connections, not only for the tank itself, but for the demountable cascade unit, are conveniently accessible from the front of the tank but are located inside the tank walls where they are amply protected against damage.

The cascade receptacle may be fabricated from any suitable light weight material though stainless steel sheeting has been found completely acceptable. In order to displace as little of the tank processing area as possible, the receptacle should have comparatively greater depth than width. The bottom of the receptacle, however, should be within easy reach of an operator inasmuch as intermittent swabbing or cleaning throughout processing operations is a highly desirable feature in tanks equipped for cascade disposal. Cascade outlet leads 44, may be conveniently tapped into the piping of the larger, main tank outlets at any point beyond main tank outlet valve 49, as a further assurance of trouble free operation.

Having described and explained the apparatus of the

What is claimed is:

1. A film processing and developing tank comprising a processing compartment; an interchangeable drainage receptacle immersibly suspendable within temperature controlled, turbulently circulated fluid from an inlet within said compartment, said receptacle extending transversely of separate paths of flow of said fluid directed longitudinally of separate auxiliary tanks interchangeably bridged from a wall of said receptable to a wall of said compartment; said receptacle having an open face extending substantially the full width of said tank, the walls of said receptacle defining a cascade barrier for disposal thereover of impurities and temperature spent fluid from all sides thereof; said barrier having a continuous length accessible for fluid cascade at least twice the length of any wall of said processing compartment.

2. A film processing and developing tank comprising a processing compartment; an interchangeable cascade receptacle immersibly suspendable within said compartment to extend normally of separate paths of flow of fluid turbulently circulated within said compartment from an inlet and between separate auxiliary tanks extending longitudinally of said receptacle; said receptacle having an open face extending substantially the full width of said tank, the walls thereof defining a barrier for cascade thereover of impurities and temperature spent fluid from all directions from the surface of the fluid in said compartment for disposal through separate drain pipes connecting said receptacle to the bottom of said compartment, the periphery of said receptacle having a continuous length accessible for fluid cascade at least twice the length of any wall of said compartment.

References Cited in the file of this patent

UNITED STATES PATENTS

| | | |
|---|---|---|
| 600,182 | Sparr | Mar. 8, 1898 |
| 1,867,190 | Stout | July 12, 1932 |
| 2,168,997 | Lankes et al. | Aug. 8, 1939 |
| 2,431,442 | Wilson | Nov. 25, 1947 |
| 2,562,588 | Traiber | July 31, 1951 |
| 2,650,527 | Caps | Sept. 1, 1953 |
| 2,747,482 | Gacki et al. | May 29, 1956 |

FOREIGN PATENTS

| | | |
|---|---|---|
| 276,924 | Germany | July 22, 1914 |